United States Patent
Keskitalo et al.

(10) Patent No.: US 12,127,062 B2
(45) Date of Patent: Oct. 22, 2024

(54) TIMING ADVANCE FOR RACH-LESS BACKHAUL HANDOVER

(71) Applicant: Nokia Solutions and Networks Oy, Espoo (FI)

(72) Inventors: Ilkka Keskitalo, Oulu (FI); Esa Malkamaki, Espoo (FI); Dawid Koziol, Wroclaw (PL); Juha Sakari Korhonen, Espoo (FI)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 693 days.

(21) Appl. No.: 17/281,150

(22) PCT Filed: Sep. 24, 2019

(86) PCT No.: PCT/IB2019/058097
§ 371 (c)(1),
(2) Date: Mar. 29, 2021

(87) PCT Pub. No.: WO2020/070585
PCT Pub. Date: Apr. 9, 2020

(65) Prior Publication Data
US 2021/0345211 A1 Nov. 4, 2021

Related U.S. Application Data

(60) Provisional application No. 62/742,141, filed on Oct. 5, 2018.

(51) Int. Cl.
*H04W 36/12* (2009.01)
*H04W 24/10* (2009.01)
*H04W 56/00* (2009.01)

(52) U.S. Cl.
CPC ........... *H04W 36/12* (2013.01); *H04W 24/10* (2013.01); *H04W 56/005* (2013.01)

(58) Field of Classification Search
None
See application file for complete search history.

(56) References Cited

U.S. PATENT DOCUMENTS

2008/0182579 A1* 7/2008 Wang ............... H04W 56/0045
455/436
2008/0267127 A1* 10/2008 Narasimha ........ H04W 36/0016
370/331

(Continued)

FOREIGN PATENT DOCUMENTS

WO 2020/057732 A1 3/2020

OTHER PUBLICATIONS

Office Action received for corresponding Indian Patent Application No. 202147019532, dated Feb. 14, 2022, 6 pages.
"3rd Generation Partnership Project; Technical Specification Group Radio Access Network; Evolved Universal Terrestrial Radio Access (E-UTRA); Radio Resource Control (RRC); Protocol specification (Release 15)", 3GPP TS 36.331 V15.2.2, Jun. 2018, pp. 1-791.

(Continued)

*Primary Examiner* — Duc T Duong
(74) *Attorney, Agent, or Firm* — Lippes Mathias LLP

(57) ABSTRACT

A technique of performing a handover procedure involves providing a proper timing adjustment indication for the UE performing RACH-less HO. Even though the discussion herein is on IAB scenarios and the idea takes an advantage of IAB nodes being in fixed locations (i.e., not moving in the network), it can be applied to UEs in general. The timing adjustment provided in performing a HO in an IAB network according to the improved techniques involves computing a timing advance (TA) to be used by an IAB node prior to executing HO to an alternative serving node. Such a use of a TA may enable a bypassing of a RACH procedure when accessing a cell.

18 Claims, 11 Drawing Sheets

(56) References Cited

U.S. PATENT DOCUMENTS

| | | | | |
|---|---|---|---|---|
| 2014/0086213 | A1* | 3/2014 | Kwon | H04W 36/08 370/331 |
| 2014/0308956 | A1* | 10/2014 | Zhang | H04W 56/0055 455/436 |
| 2015/0223124 | A1* | 8/2015 | Wang | H04W 24/08 455/436 |
| 2015/0373660 | A1* | 12/2015 | Gunnarsson | H04L 5/0058 370/350 |
| 2016/0192306 | A1* | 6/2016 | Ma | H04W 56/00 370/350 |
| 2017/0034840 | A1* | 2/2017 | Mandil | H04W 72/12 |
| 2018/0139002 | A1* | 5/2018 | Blasco Serrano | H04J 3/0658 |
| 2018/0213457 | A1* | 7/2018 | Tang | H04W 36/0083 |
| 2018/0242268 | A1* | 8/2018 | Rune | H04W 56/0015 |
| 2019/0349036 | A1* | 11/2019 | Wang | H04B 7/15528 |
| 2020/0015316 | A1* | 1/2020 | Islam | H04W 56/0045 |
| 2020/0053682 | A1* | 2/2020 | Abedini | H04W 56/0025 |
| 2021/0250884 | A1* | 8/2021 | Iyer | H04W 56/0045 |
| 2021/0345262 | A1* | 11/2021 | Harada | H04W 88/14 |
| 2021/0377936 | A1* | 12/2021 | Yuan | H04B 7/15542 |

OTHER PUBLICATIONS

"3rd Generation Partnership Project; Technical Specification Group Radio Access Network; Evolved Universal Terrestrial Radio Access (E-UTRA); Physical layer procedures (Release 15)", 3GPP TS 36.213 V15.2.0, Jun. 2018, pp. 1-541.

International Search Report and Written Opinion received for corresponding Patent Cooperation Treaty Application No. PCT/IB2019/058097, dated Dec. 18, 2019, 18 pages.

"Service Interruption Time Minimization For Backhaul Links", 3GPP TSG-RAN WG2 Meeting #103bis, R2-1814998, Agenda: 11.1.3, Nokia, Oct. 8-12, 2018, 7 pages.

"3rd Generation Partnership Project; Technical Specification Group Radio Access Network; Study on Integrated Access and Backhaul; (Release 15)", 3GPP TR 38.874 V0.5.0, Oct. 2018, pp. 1-78.

"IAB Node Discovery and Route Management Procedures", 3GPP TSG-RAN WG2 NR AH1807 Meeting, R2-1810383, Agenda: 11.1.3, AT&T, Jul. 2-6, 2018, pp. 1-6.

"Measurements for IAB", 3GPP TSG-RAN WG2 Meeting #103, R2-1812301 (Revision of R2-1810305), Agenda: 11.1.3, Nokia, Aug. 20-24, 2018, 5 pages.

* cited by examiner

TIMING ADVANCE FOR RACH-LESS BACKHAUL HANDOVER

RELATED APPLICATION

This application claims priority to PCT Application No. PCT/IB2019/058097, filed on Sep. 24, 2019, which claims priority to U.S. Application No. 62/742,141, filed on Oct. 5, 2018, each of which is incorporated herein by reference in its entirety.

TECHNICAL FIELD

This description relates to communications.

BACKGROUND

A communication system may be a facility that enables communication between two or more nodes or devices, such as fixed or mobile communication devices. Signals can be carried on wired or wireless carriers.

An example of a cellular communication system is an architecture that is being standardized by the 3$^{rd}$ Generation Partnership Project (3GPP). A recent development in this field is often referred to as the long-term evolution (LTE) of the Universal Mobile Telecommunications System (UMTS) radio-access technology. E-UTRA (evolved UMTS Terrestrial Radio Access) is the air interface of 3GPP's LTE upgrade path for mobile networks. In LTE, base stations or access points (APs), which are referred to as enhanced Node AP (eNBs), provide wireless access within a coverage area or cell. In LTE, mobile devices, or mobile stations are referred to as user equipments (UE). LTE has included a number of improvements or developments.

A global bandwidth shortage facing wireless carriers has motivated the consideration of the underutilized millimeter wave (mmWave) frequency spectrum for future broadband cellular communication networks, for example mmWave (or extremely high frequency) may, for example, include the frequency range between 30 and 300 gigahertz (GHz). Radio waves in this band may, for example, have wavelengths from ten to one millimeters, giving it the name millimeter band or millimeter wave. The amount of wireless data will likely significantly increase in the coming years. Various techniques have been used in attempt to address this challenge including obtaining more spectrum, having smaller cell sizes, and using improved technologies enabling more bits/s/Hz. One element that may be used to obtain more spectrum is to move to higher frequencies, e.g., above 6 GHz. For fifth generation wireless systems (5G), an access architecture for deployment of cellular radio equipment employing mmWave radio spectrum has been proposed. Other example spectrums may also be used, such as cmWave radio spectrum (e.g., 3-30 GHz).

SUMMARY

According to an example implementation, a method includes measuring, by a first node of a wireless network, a timing of a first signal transmitted by a second node of the wireless network to produce a measurement result; generating, by the first node, a timing advance (TA) value based on the measurement result and a downlink (DL) transmission (TX) reference time of the wireless network; and transmitting, by the first node, a second signal to the second node at a time advanced by the TA value with respect to a reception (RX) reference time of the second node.

According to an example implementation, an apparatus at a first node of a wireless network includes at least memory and controlling circuitry coupled to the memory, the controlling circuitry being configured to measure a timing of a first signal transmitted by a second node of the wireless network to produce a measurement result; generate a timing advance (TA) value based on the measurement result and a downlink (DL) transmission (TX) reference time of the wireless network; and transmit a second signal to the second node at a time advanced by the TA value with respect to a reception (RX) reference time of the second node.

According to an example implementation, an apparatus includes means for measuring a timing of a first signal transmitted by a second node of a wireless network to produce a measurement result; means for generating a timing advance (TA) value based on the measurement result and a downlink (DL) transmission (TX) reference time of the wireless network; and means for transmitting a second signal to the second node at a time advanced by the TA value with respect to a reception (RX) reference time of the second node.

According to an example implementation, a computer program product includes a computer-readable storage medium and storing executable code that, when executed by at least one data processing apparatus, is configured to cause the at least one data processing apparatus to perform a method including measuring, by a first node of a wireless network, a timing of a first signal transmitted by a second node of the wireless network to produce a measurement result; generating, by the first node, a timing advance (TA) value based on the measurement result and a downlink (DL) transmission (TX) reference time of the wireless network; and transmitting, by the first node, a second signal to the second node at a time advanced by the TA value with respect to a reception (RX) reference time of the second node.

According to an example implementation, a method includes measuring, by a first node of an asynchronous wireless network, a timing of a first signal transmitted by a second node of the wireless network to produce a measurement result; generating, by the first node, a timing advance (TA) value based on the measurement result and an uplink (UL) reception (RX) reference time of the first node and sending the TA value to the second node via a third node; and receiving, by the first node, a second signal from the second node, wherein the second signal is transmitted by the second node at a time advanced by the TA value with respect to a downlink (DL) transmission (TX) reference time of the second node.

According to an example implementation, an apparatus at a first node of an asynchronous wireless network includes at least memory and controlling circuitry coupled to the memory, the controlling circuitry being configured to measure a timing of a first signal transmitted by a second node of the wireless network to produce a measurement result; generate a timing advance (TA) value based on the measurement result and an uplink (UL) reception (RX) reference time of the first node and send the TA value to the second node via a third node; and receive a second signal from the second node, wherein the second signal is transmitted by the second node at a time advanced by the TA value with respect to a downlink (DL) transmission (TX) reference time of the second node.

According to an example implementation, an apparatus includes means for measuring a timing of a first signal transmitted by a second node of the wireless network to produce a measurement result; means for generating a timing advance (TA) value based on the measurement result and an uplink (UL) reception (RX) reference time of the first node and send the TA value to the second node via a third node; and means for receiving a second signal from the second node, wherein the second signal is transmitted by the second node at a time advanced by the TA value with respect to a downlink (DL) transmission (TX) reference time of the second node.

According to an example implementation, a computer program product includes a computer-readable storage medium and storing executable code that, when executed by at least one data processing apparatus, is configured to cause the at least one data processing apparatus to perform a method including measuring, by a first node of an wireless network, a timing of a first signal transmitted by a second node of the wireless network to produce a measurement result; generating, by the first node, a timing advance (TA) value based on the measurement result and a an uplink (UL) reception (RX) reference time of the first node and send the TA value to the second node via a third node; and receiving, by the first node, a second signal from the second node, wherein the second signal is transmitted by the second node at a time advanced by the TA value with respect to a downlink (DL) transmission (TX) reference time of the second node.

The details of one or more examples of implementations are set forth in the accompanying drawings and the description below. Other features will be apparent from the description and drawings, and from the claims.

DETAILED DESCRIPTION

Figure 1A:
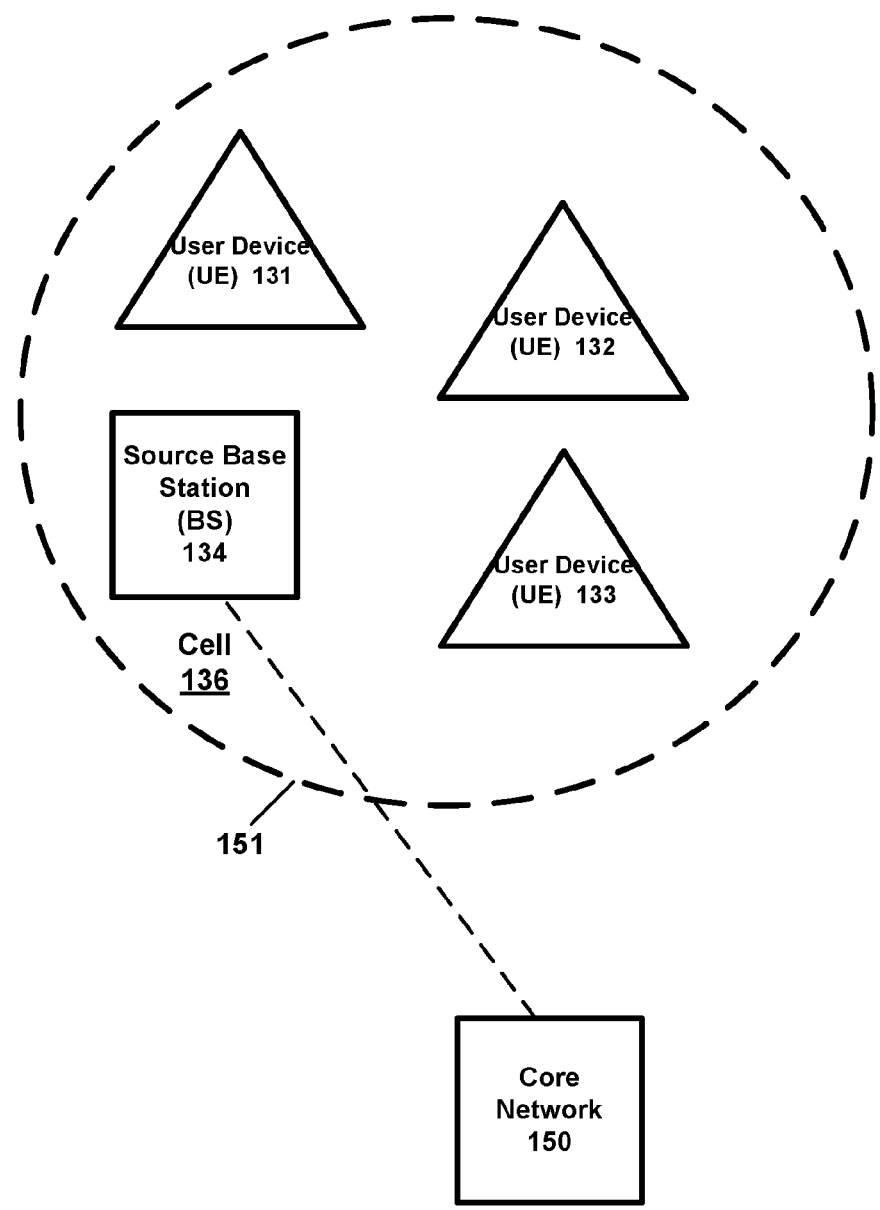
FIG. 1A is a block diagram of a wireless network according to an example implementation.

FIG. 1A is a block diagram of a wireless network 130 according to an example implementation. In the wireless network 130 of FIG. 1, user devices 131, 132, 133 and 135, which may also be referred to as mobile stations (MSs) or user equipment (UEs), may be connected (and in communication) with a base station (BS) 134, which may also be referred to as an access point (AP), an enhanced Node B (eNB), a gNB (which may be a 5G base station) or a network node. At least part of the functionalities of an access point (AP), base station (BS) or (e)Node B (eNB) may be also be carried out by any node, server or host which may be operably coupled to a transceiver, such as a remote radio head. BS (or AP) 134 provides wireless coverage within a cell 136, including to user devices 131, 132, and 133. Although only three user devices are shown as being connected or attached to BS 134, any number of user devices may be provided. BS 134 is also connected to a core network 150 via an interface 151. This is merely one simple example of a wireless network, and others may be used.

A user device (user terminal, user equipment (UE)) may refer to a portable computing device that includes wireless mobile communication devices operating with or without a subscriber identification module (SIM), including, but not limited to, the following types of devices: a mobile station (MS), a mobile phone, a cell phone, a smartphone, a personal digital assistant (PDA), a handset, a device using a wireless modem (alarm or measurement device, etc.), a laptop and/or touch screen computer, a tablet, a phablet, a game console, a notebook, and a multimedia device, as examples. It should be appreciated that a user device may also be a nearly exclusive uplink only device, of which an example is a camera or video camera loading images or video clips to a network.

In LTE (as an example), core network 150 may be referred to as Evolved Packet Core (EPC), which may include a mobility management entity (MME) which may handle or assist with mobility/handover of user devices between BSs, one or more gateways that may forward data and control signals between the BSs and packet data networks or the Internet, and other control functions or blocks.

The various example implementations may be applied to a wide variety of wireless technologies, wireless networks, such as LTE, LTE-A, 5G (New Radio, or NR), cmWave, and/or mmWave band networks, or any other wireless network or use case. LTE, 5G, cmWave and mmWave band networks are provided only as illustrative examples, and the various example implementations may be applied to any wireless technology/wireless network. The various example implementations may also be applied to a variety of different applications, services or use cases, such as, for example, ultra-reliability low latency communications (URLLC), Internet of Things (IoT), enhanced mobile broadband, massive machine type communications (MMTC), vehicle-to-vehicle (V2V), vehicle-to-device, etc. Each of these use cases, or types of UEs, may have its own set of requirements.

Figure 1B:
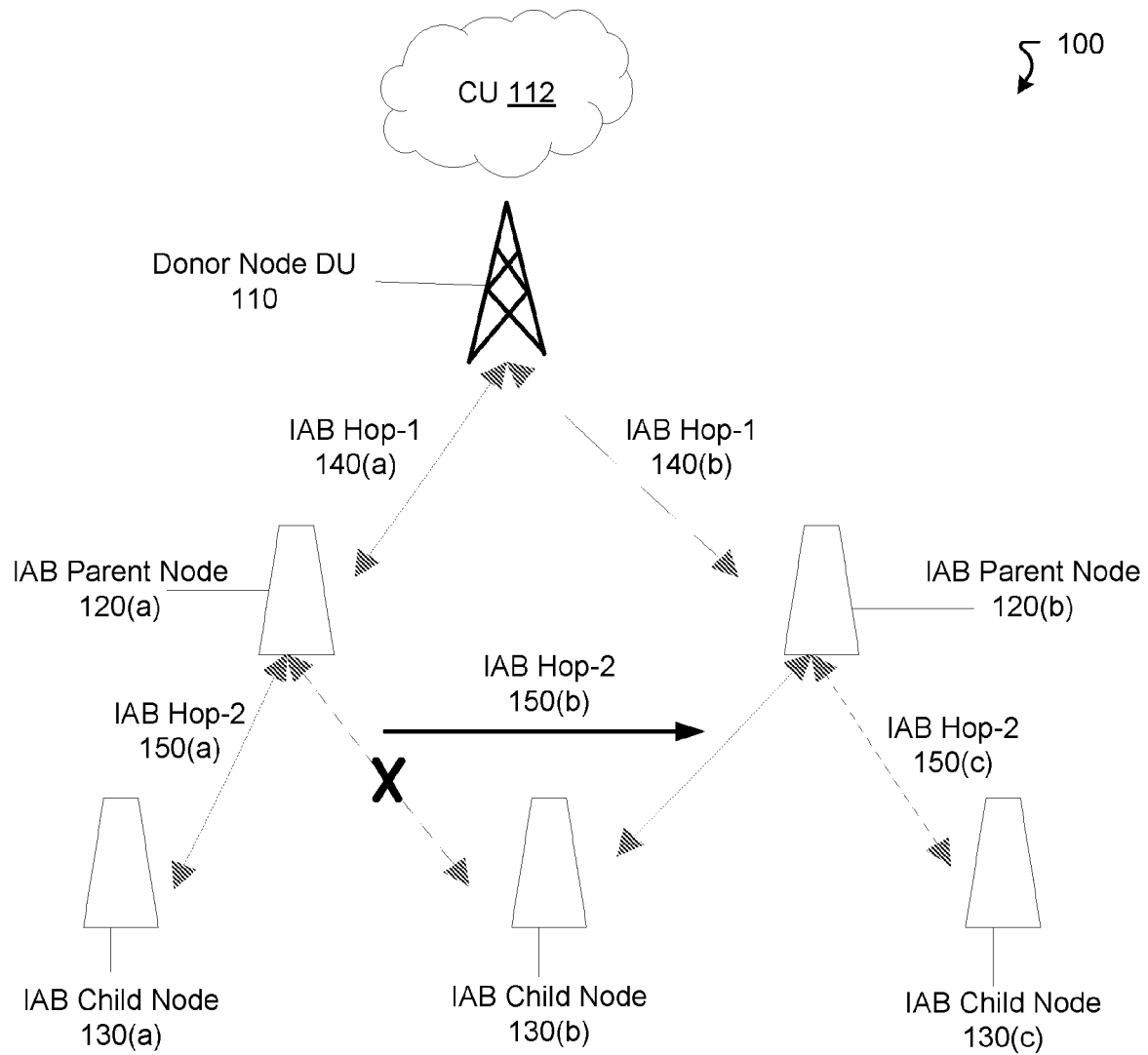
FIG. 1B is a diagram illustrating a backhaul network topology for an integrated access and backhaul (IAB) network according to an example implementation.

FIG. 1B is a diagram illustrating an example backhaul network topology for an integrated access and backhaul (IAB) network 100. As shown in FIG. 1B, IAB network 100 includes a centralized unit (CU) 112, a donor node distributed unit (DU) 110, IAB parent nodes 120(a,b), and IAB child nodes 130(a,b,c). It should be noted that IAB child nodes can act as IAB parent nodes to other IAB nodes connected to them (not shown in the figure). Furthermore, the IAB parent nodes 120 act as IAB child nodes towards Donor node DU 110.

In IAB deployments, the traffic from IAB nodes is wirelessly backhauled between IAB node and IAB Donor using an established backhaul network topology. Two types of topologies are considered—spanning tree and directed acyclic graph. FIG. 1B illustrates an example of a spanning tree topology. The donor node DU 110 is connected to the IAB parent nodes 120(*a,b*) by respective BH connections IAB Hop-1 140(*a,b*), and the IAB parent nodes 120(*a,b*) are connected to the IAB child nodes 130(*a,b,c*) by respective BH connections 150(*a,b,c*).

Once the topology is established, it may need to be occasionally modified in response to radio environment changes. In some implementations, the IAB nodes are fixed in location. In such implementations, radio conditions will not be impacted by mobility but rather by changes in the environment around the IAB nodes, e.g., moving obstacles, weather conditions, etc., which may cause sudden signal blockages or deterioration. In some implementations, the IAB network uses millimetre (mm) wave frequency ranges which are impacted by such environmental changes. At the same time, each time a radio link of a backhaul connection is experiencing sudden deterioration or blockage, this will cause service interruption for many Access UEs (all UEs connected to the subtending part of the topology tree). One should then provide the best possible backhaul connection and react very fast to sudden radio signal drops. As shown in FIG. 1B, for example, a BH connection between IAB child node 130(*b*) and IAB parent node 120(*a*) has deteriorated. In response, the IAB network 100 may perform a handover (HO) of the IAB child node 130(*b*) (i.e., a migrating node) to the IAB parent node 120(*b*) via IAB Hop-2 150(*b*).

Another reason for HO may be congestion of a link. For instance, if 140(*a*) becomes very loaded while 140(*b*) has free capacity, 150(*b*) could be decided to be moved from 120(*a*) to 120(*b*) even if radio link between 130(*b*) and 120(*a*) were good.

Figure 1C:
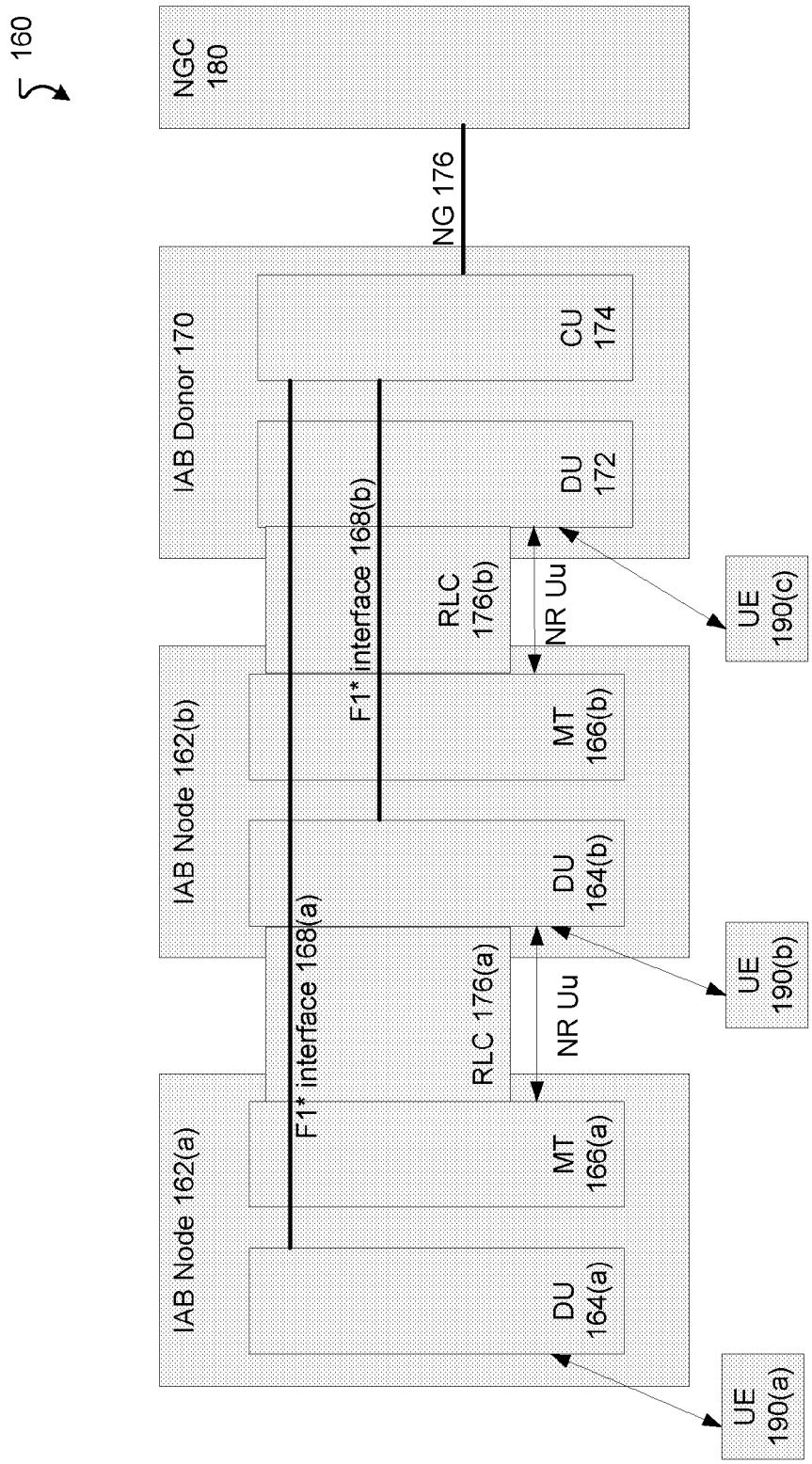
FIG. 1C is a diagram illustrating an IAB network architecture according to an example implementation.

FIG. 1C is a diagram illustrating an example architecture of an IAB network 160. As shown in FIG. 1C, the IAB network 160 includes IAB nodes 162(*a,b*), IAB donor node 170, and user equipments (UEs) 190(*a,b,c*). IAB donor node 170 is connected to the next-generation (NG) core (NGC) network 180 via NG connection 176.

The IAB nodes 162(*a,b*) each include a respective DU 164(*a,b*) and a respective mobile termination (MT) part 166(*a,b*). The UEs 190(*a,b*) are shown to be connected to the respective DUs 164(*a,b*) of the IAB nodes 162(*a,b*). In turn, the MT 166(*a*) of the IAB node 162(*a*) is connected to the DU 164(*b*) of the IAB node 162(*b*). Accordingly, the IAB node 162(*a*) is a child node of the IAB parent node 162(*b*). Further, there is a radio link channel (RLC) 176(*a*) between the MT 166(*a*) of the IAB child node 162(*a*) and the DU 164(*b*) of the parent node 162(*b*). UEs 190(*a,b*) are connected to respective DUs 164(*a,b*).

The IAB donor node 170 includes a DU 172 and a centralized unit (CU) 174. The IAB donor node 170 is connected to the NGC 180 at the CU 174. There is a radio link channel (RLC) 176(*b*) between the MT 166(*b*) of the IAB node 162(*b*) and the DU 172 of the IAB donor node 170. Thus, the IAB node 162(*b*) is also a child IAB node and the IAB donor node is its parent node. Further, there is an F1* interface 168(*a*) between the DU 164(*a*) and CU 174, and an F1* interface 168(*b*) between the DU 164(*b*) and CU 174. UE 190(*c*) is connected to IAB donor DU 172.

IAB network 160 represents one possible architecture. All architectures strive to reuse network logical entities, interfaces and functions as defined for new radio (NR) with some potential enhancements. What is clear though is that an IAB node consists of a Mobile Termination part (often referred to as a UE part as well) and Distributed Unit (in some implementations, this may also be full gNB, i.e., Central Unit+ Distributed Unit). IAB child node (e.g., IAB child node 130(*b*) in FIG. 1B) MT part connects to its parent node (e.g., IAB parent node 120(*a*)) DU using traditional RRC Connection and once it connects it performs normal RRM measurements and other procedures (e.g., beam management, radio link monitoring, etc.). It should be noted that in this example architecture the network side RRC entity resides in the Donor CU and the IAB node side RRC in the IAB node MT, i.e., the RRC connection is between the IAB MT and Donor CU. When the topology needs to be updated (e.g., due to deterioration of the signal level between IAB child node 130(*b*) and IAB parent node 120(*a*), a HO procedure is used to move a connection to another IAB node (e.g., IAB parent node 120(*b*) in FIG. 1B).

Figure 2:
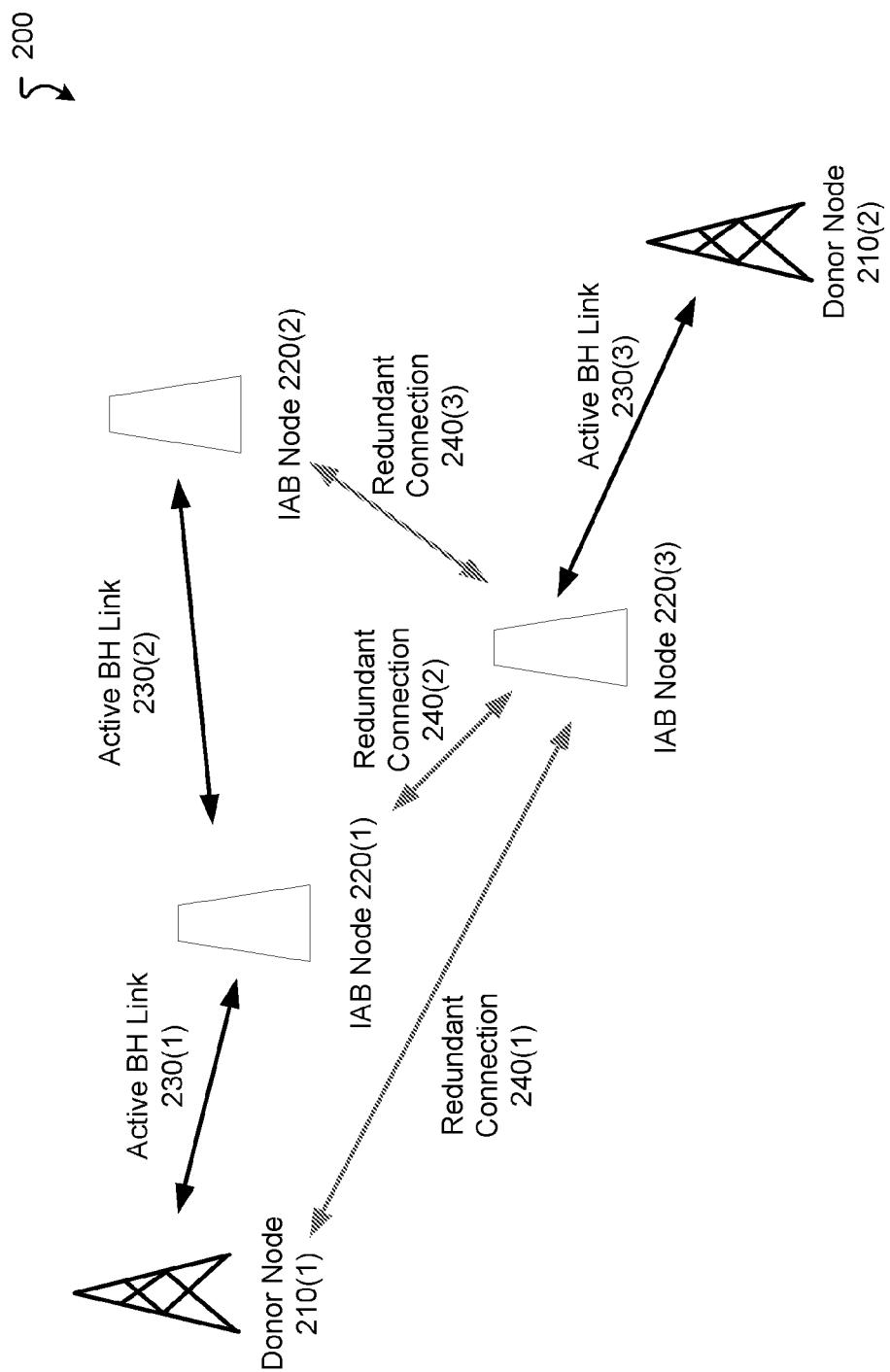
FIG. 2 is a diagram illustrating an IAB network including donor and IAB nodes according to an example implementation.

FIG. 2 is a diagram illustrating an example deployment of an IAB network 200 including IAB donor nodes 210(1,2) and IAB nodes 220(1,2,3). As shown in FIG. 2, IAB node 220(1) has an active backhaul (BH) link 230(1) to the donor node 210(1). At the same time, the IAB node 220(1) has an active BH link 230(2A) to IAB node 220(2). This would make IAB node 220(2) a child node to parent node IAB node 220(1). Further, IAB node 220(3) has an active BH link 230(3) to donor node 210(2). There are also inactive, redundant or potential connections 240(1) between IAB donor node 210(1) and IAB node 220(3), 240(2) between IAB node 220(1) and IAB node 220(3), and 240(3) between IAB node 220(2) and IAB node 220(3).

With the above-referenced IAB deployment, IAB nodes shall discover new deployed IAB nodes as well as monitor the neighbouring nodes being candidates for BH links in case the serving connection is degraded or lost or if another serving connection is better for balancing load over links. For that purpose, there should be appropriate signal transmissions from each node with predefined or detectable timing as well as corresponding measurement gaps for the nodes measuring the radio characteristics towards the neighbouring nodes. The transmission (TX) signals can be basically any of the existing synchronization or reference signals just that they would result in accurate enough estimates for the radio link parameter.

As discussed with respect to FIG. 1C, each IAB node (e.g., IAB node 162(*a*)) includes the following:
 a mobile termination (MT) part (e.g., MT 166(*a*)) responsible for synchronization, connection establishment to the serving node, radio measurements for RRM purposes and reporting of those, and
 a DU part (e.g., 164(*a*)) of a distributed gNB architecture where the CU resides at a donor node (e.g., CU 174 of IAB donor node 170). In some implementations, the above-described distributed gNB functionality may be replaced with a full gNB functionality.

Neighbour node monitoring may be performed by the MT part (e.g., MT 166(*a*)) measuring e.g., downlink (DL) broadcast signals like synchronization signals (PSS, SSS). Other signals can be e.g., channel state information reference signals (CSI-RS) which can be separately configured. In some implementations, the monitoring is analogous to that of a normal access UE. An IAB node (e.g., IAB node 162(*a*)) may also transmit the same broadcast signals to the cell served by itself. Similarly, the IAB node or a network control function located e.g., in Donor may configure DL CSI-RS TX as needed. Such signals can be then measured by neighbour IAB nodes (e.g., IAB node 162(*b*)).

It is noted that the definition of DL or uplink (UL) is not necessarily relevant for an IAB node as an IAB node may measure transmissions and reception for both directions. Accordingly, improvements in performing HO in IAB networks described herein refer to the fact that an IAB node may measure transmissions and reception for both directions, as well as cross-link measurements for timing estimations.

Conventional approaches to HO involve supporting UEs moving through the network. In IAB deployments such as the deployment shown in FIG. 2, a reason for changing a parent node of an IAB child node (e.g., IAB donor node 210(2)) may be due to link failure or its significant deterioration (e.g., since mmWave is likely to be used, blockage is an event that can happen) and not due to mobility. Thus, a conventional HO triggers based on mobility events may not be applicable in these scenarios. What is more, in IAB networks one should minimize service interruption during HO and/or topology adaptation events as each such event has impact of quality of service and/or experience of a high number of access UEs and their users. In some implementations, an enhanced conditional HO may decrease interruption during handover. In some implementations, a skipping of a random-access channel procedure ("RACH-less") handover may decrease HO execution time. Combining these two techniques—enhanced conditional HO and RACH-less HO—can bring the HO execution time further down.

Accordingly, in contrast to the conventional approaches to HO in an IAB network, improved techniques involve providing a proper timing adjustment indication for the UE performing RACH-less HO. Even though the discussion herein is on IAB scenarios and the idea takes an advantage of IAB nodes being in fixed locations (i.e., not moving in the network), it can be applied to UEs in general. The timing adjustment provided in performing a HO in an IAB network according to the improved techniques involves computing a timing advance (TA) to be used by an IAB node prior to executing HO to an alternative serving node (e.g., donor node 210(1) of FIG. 2). Such a use of a TA may enable a bypassing of a RACH procedure when accessing a cell.

In an IAB network, IAB nodes are measuring each others' DL broadcast signals. As IAB nodes include both DL TX and RX functionalities, measurements can be done between the nodes in both directions. A monitoring of an IAB neighbor node by an IAB node may include an estimation of a timing difference between a DL TX of the IAB node and a reception time of a measured signal from the IAB neighbor node. Based on the timing difference, the IAB node can estimate the TA value needed for the UL TX between the IAB node and the IAB neighbour node. In some implementations, there will be TA values for each IAB node for which a signal is measured, and for each direction (i.e., from parent to child and from child to parent or in general between two nodes A and B both can obtain TA towards the other node).

During an execution of a HO procedure, a target IAB node adds a derived TA value in an HO command. The HO command is sent as a response to a HO request message. The TA value is selected based on the migrating IAB node (or MT part of it) that is configured to make the HO. The migrating IAB node uses the TA value provided in the HO command for the first (UL) TX and therefore can skip the RACH procedure and can go directly to the shared channel and dedicated connection. In some other implementations, the migrating IAB node is able to determine the proper TA for the first UL TX towards the target node without receiving the TA value in the HO command.

In some implementations, there is e.g., a semi-persistent scheduling (SPS) or a dynamic UL grant for immediate access in the target cell. With SPS, resources for MT immediate access will be reserved. In some implementations, the immediate access is reserved for a period of time during which the HO execution is assumed to occur. With a dynamic UL grant, the MT starts to monitor a physical downlink control channel (PDCCH) on a given resource to detect an UL grant from the target node. In some implementations, the IAB node can be configured with scheduling request (SR) resources for the target cell which the IAB node MT part can start using immediately without RACH procedure.

In some implementations, in addition to the TA, each IAB node stores the best beam(s) for the inter-node links during the measurement phase. For example, the target IAB node can reserve resources for immediate access only in the directions (beams) detected as best for the new radio link. Along these lines, it may utilize information about the best beam(s) a migrating IAB node has detected e.g., from the CSI-RS measurements. That information can be extracted from the measurement report and forwarded to the target node by the serving node. In some implementations, in case the target IAB node is not informed about the best beam, the target IAB node can reserve access resources for multiple (or all) beams. In this case, the HO command may include information about the association between the CSI-RS signals and reserved access resources for migrating node to select the best UL resources corresponding to best measured beam. In some implementations, different (narrow) beams may result in different TA values based on the radio propagation at least in case of non-line-of-sight (NLOS) radio links.

The process of determining TA values for HO in an IAB network may depend on whether the IAB network is synchronous or if more generally applicable procedure is necessary or otherwise preferred. Further details of such processes are disclosed with regard to FIGS. 3-4. Here synchronous refers to the situation that DL transmissions of all nodes are aligned and, in addition, the wanted BH UL RX timing with respect to the own DL timing in target IAB node is known by the migrating node. The migrating node may know the wanted BH UL—own DL timing difference (of target node) by e.g., standard specification, by broadcast or dedicated signaling. In the more general situation, DL transmissions of the nodes could be misaligned and/or the wanted BH UL timing relative to the own DL timing could be set differently in different nodes and would not be signaled. An example of applying the more general procedure is that all DL TX timings are aligned between different nodes, and the RX timings of BH UL (from child node) and DL (from parent node) are aligned in each node. Then the wanted BH UL—own DL timing difference in a node depends on the propagation time of signals between the node and its parent node, and, without signaling, would not be known to the migrating node. Another example of the more general situation is that DL TX timings are not aligned between different nodes.

Figure 3:
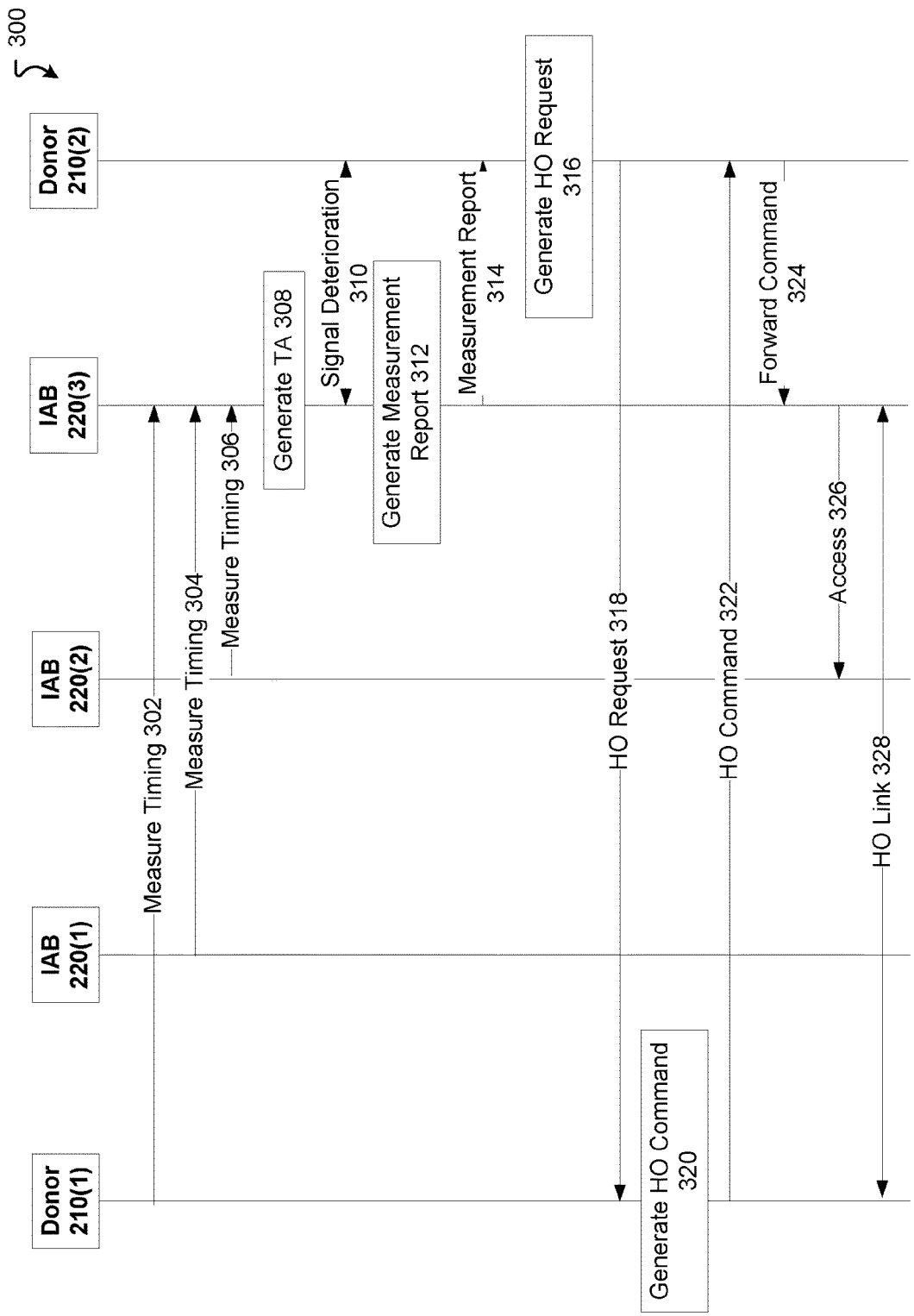
FIG. 3 is a sequence diagram illustrating a handover (HO) in a synchronous IAB network according to an example implementation.

FIG. 3 is a sequence diagram illustrating an example handover (HO) procedure 300 in a synchronous IAB network according to the improved techniques. As shown in FIG. 3, the sequence diagram makes reference to members of the IAB network 200 shown in FIG. 2: the donor IAB nodes 210(1,2) and the IAB nodes 220(1,2,3). In this case, the migrating IAB node is the IAB node 220(3), the target IAB node is one of IAB nodes 210(1), 220(1) or 220(2), and the serving node is the donor node 210(2). Note that the CU of IAB donor node 210(1) covers both IAB nodes 220(1,2) and the CU of IAB donor node 210(2) covers IAB node 220(3).

In the synchronous IAB network, the migrating node, i.e., IAB node 220(3), computes the TA used in the HO procedure 300. Accordingly, as shown in FIGS. 3, at 302, 304, and 306, the IAB node 220(3) performs a measurement on a signal at the IAB nodes 210(1), 220(1), and 220(2), respectively. In some implementations, the signal is a DL broadcast signal. In some implementations, the DL broadcast signal is a synchronization signal block (SSB).

At 308, the IAB node 220(3) generates a TA value based on the measurements on the signals at the IAB donor 210(1), the IAB node 220(1), and the IAB node 220(2). Because the IAB network is synchronous, the TA value for an IAB node is, in some implementations, based on a difference between the measured timing for that IAB node and a reference time for the synchronous IAB node performing the measurements. In some implementations, the reference time is the DL signal timing for the IAB network. Further details concerning generating the TA are discussed with regard to FIG. 5.

At 310, at some time later, the IAB node 220(3) receives an indication that the signal strength of signals received from the IAB donor (serving) node 210(2) has deteriorated. In some implementations, the indication is received when the signal strength falls below a specified signal strength threshold. In some implementations, the indication is received when a neighbor IAB node's signal strength is some factor better than the signal strength. In some implementations, the indication is received in response to load conditions or a Topology Management function which decides that another network topology may be more efficient. In response, at 312, the IAB node 220(3) generates a measurement report to initiate a HO. The measurement report includes the TA value of a target node (e.g., IAB node 220(2)). At 314, the IAB node 220(3) sends the measurement report to the IAB donor node 210(2). It should be noted that in some embodiments steps 310, 312 and 314 may be missing, e.g., if Donor 210(2) decides to request HO due to load balancing needs.

At 316, after the IAB donor node 210(2) receives the measurement report, the IAB donor node 210(2) generates a HO request. In addition to the TA value, the HO request also indicates the strongest IAB node as measured by IAB node 220(3). In this case, it is assumed that that node is IAB node 220(2). At 318, the IAB donor node 210(2) sends the HO request to the IAB donor node 210(1), in which CU the radio resource control (RRC) and the radio resource management (RRM) run. In some implementations the TA value is not indicated in the HO request.

At 320, the IAB donor 210(1) makes a decision to generate a HO command message. In some cases, the IAB donor 210(1) may decide to not generate a HO command message based on a number of factors (e.g., environmental conditions, DL signal strengths to IAB nodes 220(1) and 220(2), network load, etc.). In some implementations, the HO command message may indicate whether a RACH-less HO is allowed. In some implementations, RACH-less HO is a default in an IAB network. The HO command message includes the TA value and specifies the target node, i.e., IAB node 220(2). At 322, the IAB donor node 210(1) sends the HO command message to the IAB donor node 210(2). At 324, the IAB donor node 210(2) forwards the HO command message to the migrating node, the IAB node 220(3). In some implementations, the HO command message is forwarded in an RRC Reconfiguration message. In some implementations, the TA value is not included into the HO command but the migrating node is instructed to use the TA value it has derived by itself.

At 326, the IAB node 220(3) accesses the IAB node 220(2), skipping the RACH procedure per the HO command message. In accessing the IAB node 220(2), the IAB node 220(3) sends an UL TX signal at a time advanced by the TA value. Once the IAB node 220(2) is accessed, the IAB node 220(3) is handed over and accesses the IAB donor node 210(1) via the IAB node 220(2). In some implementations, the IAB node 220(3) is handed over and accesses the IAB donor node 210(1) via the IAB node 220(1).

In some implementations, the migrating node indicates in a measurement report that it has computed a valid TA value without including the TA value in the report. The source node would then send a HO request with an indication that a migrating node has a TA value computed. Based on the HO request, the target node sends a HO command message with an indication that a RACH-less procedure may be performed using the computed TA value. Then, during the HO, the migrating node may use the TA value to perform the HO.

The HO operation 300 described above is for the case where IAB network is based on L2 relaying with split gNB architecture, i.e., CU is at the donor nodes 210(1,2) and DU at the IAB nodes 220(1,2,3). In some implementations, a similar procedure may be defined for L3 relaying where the IAB nodes 220(1,2,3) host a whole gNB and the inter-node signalling can use Xn interface between the neighbouring nodes.

The HO operation 300 described above may assume that conditions in the link between IAB node 220(3) and IAB donor node 210(2) deteriorate slowly enough to allow HO signalling between IAB node 220(3) and IAB donor node 210(2) before a total connection break between them. In some implementations, in preparing sudden breaks (that will be typical with millimetre wave communications), each IAB node may be prepared with a set of candidate connections with a TA estimates for each connection. For example, based on measurements, it may be decided that IAB node 220(1) and IAB node 220(2) are good candidate connections for IAB node 220(3) to be prepared for the connection break between IAB node 220(3) and IAB donor node 210(2). In this example, IAB node 220(1) and IAB node 220(2) would be requested to provide TA values for IAB node 220(3) transmitting towards them. These TA values are signalled for IAB node 220(3) through the CUs. If a connection between IAB node 220(3) and IAB donor node 210(2) breaks, IAB node 220(3) can contact either IAB node 220(1) or IAB node 220(2) by transmitting with the TA estimate on a SR resource that IAB node 220(1) or IAB node 220(2) has indicated when giving the TA value. In some implementations, IAB node 220(3) may estimate the TA values towards IAB node 220(1) and 220(2) by itself. In that case, there is no need to signal them.

For beam selection, the measurements can use CSI-RS, TRS or other suitable configurable signals to perform so called beam refinement where the aim is to select best RX and TX beams for the data connection. Broadcast signals (e.g., SSB, SI, etc.) may use wider beams. CSI-RS of different IAB nodes are signalled between the nodes when configuring the measurements (RS signal transmissions and corresponding measurement configuration. The measured and selected CSI-RS signal(s) (or beam) may also be signalled during the HO execution.

Figure 4:
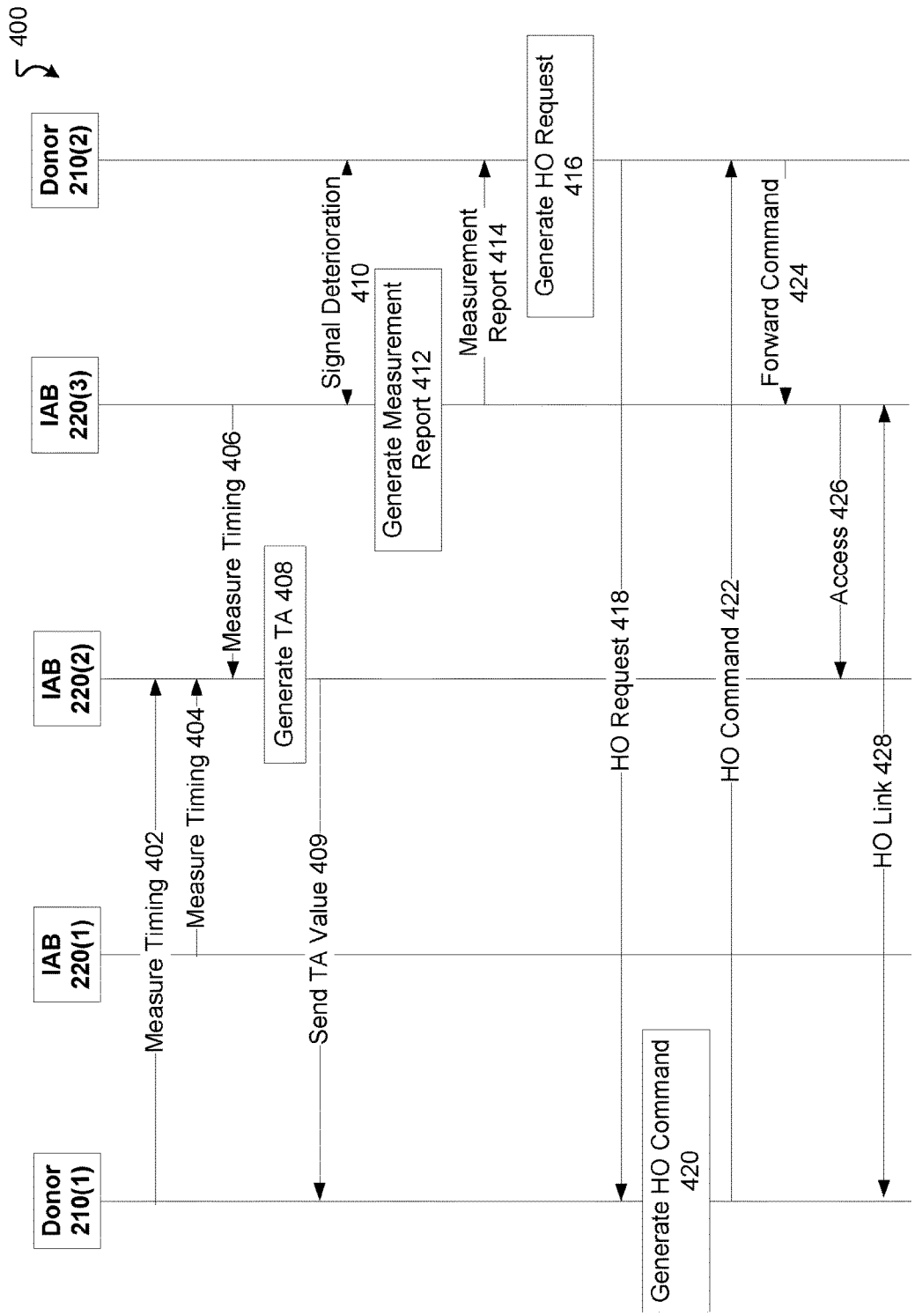
FIG. 4 is a sequence diagram illustrating a HO in an asynchronous IAB network according to an example implementation.

FIG. 4 is a sequence diagram illustrating a HO procedure 400 in an asynchronous or synchronous IAB network. As shown in FIG. 4, the sequence diagram makes reference to members of the IAB network 200 shown in FIG. 2: the donor IAB nodes 210(1,2) and the IAB nodes 220(1,2,3). In this case, the migrating IAB node is the IAB node 220(3), the target IAB node is one of IAB nodes 220(1) or 220(2), and the serving node (before HO) is the donor node 210(2). Note that the CU of IAB donor node 210(1) covers both IAB nodes 220(1,2) and the CU of IAB donor node 210(2) covers IAB node 220(3).

In the asynchronous or synchronous IAB network, a target node, i.e., IAB node 220(2), computes the TA used in the HO procedure 400. Accordingly, as shown in FIGS. 4, at 402, 404, and 406, the IAB node 220(2) performs a measurement on a signal at the IAB donor DU 210(1) and IAB nodes 220(1) and 220(3), respectively. In some implementations, the signal is a DL broadcast signal. In some implementations, the DL broadcast signal is a synchronization signal block (SSB).

At 408, the IAB node 220(2) generates TA values based on the measurements on the signals at the IAB donor 210(1), the IAB node 220(1), and the IAB node 220(3). Because the IAB network is asynchronous, the TA value for an IAB node is, in some implementations, based on a difference between the measured timing for that IAB node and a reference time for the measuring IAB node. In general, typically the reference time is the UL signal reception timing for the measuring IAB node. In some implementations, the reference time is the DL signal timing for the measuring IAB node. Further details concerning generating the TA are discussed with regard to FIG. 6. At 409, the IAB node 220(2) sends the TA value to the IAB donor node 210(1) (e.g., via a DU/CU link).

At 410, at some time later, the IAB node 220(3) receives an indication or detects that the signal strength of signals received from the IAB donor (serving) node 210(2) has deteriorated. In some implementations, the indication is received or measurement report triggered when the signal strength falls below a specified signal strength threshold. In some implementations, the indication is received or the measurement report triggered when a neighbor IAB node's signal strength is some factor better than the signal strength. In some implementations, the indication is received in response to load conditions or a Topology Management function which decides that another network topology may be more efficient. In response, at 412, the IAB node 220(3) generates a measurement report to initiate a HO. At 414, the IAB node 220(3) sends the measurement report to the IAB donor node 210(2). In some implementations, steps 410, 412 and 414 may be missing and Donor 210(2) makes the HO decision by itself (e.g., based on some load information).

At 416, after the IAB donor node 210(2) receives the measurement report or in some implementations, decides itself to request HO, the IAB donor node 210(2) generates a HO request. The HO request may indicate the strongest IAB node as measured by IAB node 220(3). In this case, it is assumed that that node is IAB node 220(2). At 418, the IAB donor node 210(2) sends the HO request to the IAB donor node 210(1), in which CU the radio resource control (RRC) and the radio resource management (RRM) run.

At 420, the IAB donor 210(1) makes a decision to generate a HO command message. In some cases, the IAB donor 210(1) may decide to not generate a HO command message based on a number of factors (e.g., environmental conditions, DL signal strengths to IAB nodes 220(1) and 220(2), etc.). In some implementations, the HO command message may indicate whether a RACH-less HO is allowed. In some implementations, RACH-less HO is a default in an IAB network. The HO command message includes the TA value and specifies the target node, i.e., IAB node 220(2). At 422, the IAB donor node 210(1) sends the HO command message to the IAB donor node 210(2). At 424, the IAB donor node 210(2) forwards the HO command message to the migrating node, the IAB node 220(3). In some implementations, the HO command message is forwarded in an RRC Reconfiguration message.

At 426, the IAB node 220(3) accesses the IAB node 220(2), skipping the RACH procedure per the HO command message. In accessing the IAB node 220(2), the IAB node 220(3) sends an UL TX signal at a time advanced by the TA value. The timing reference for TA in the IAB node 220(3) in this case is the IAB node 220(3) own DL TX timing. Once the IAB node 220(2) is accessed, the IAB node 220(3) is handed over and accesses the IAB donor node 210(1) via the IAB node 220(2).

Figure 5:
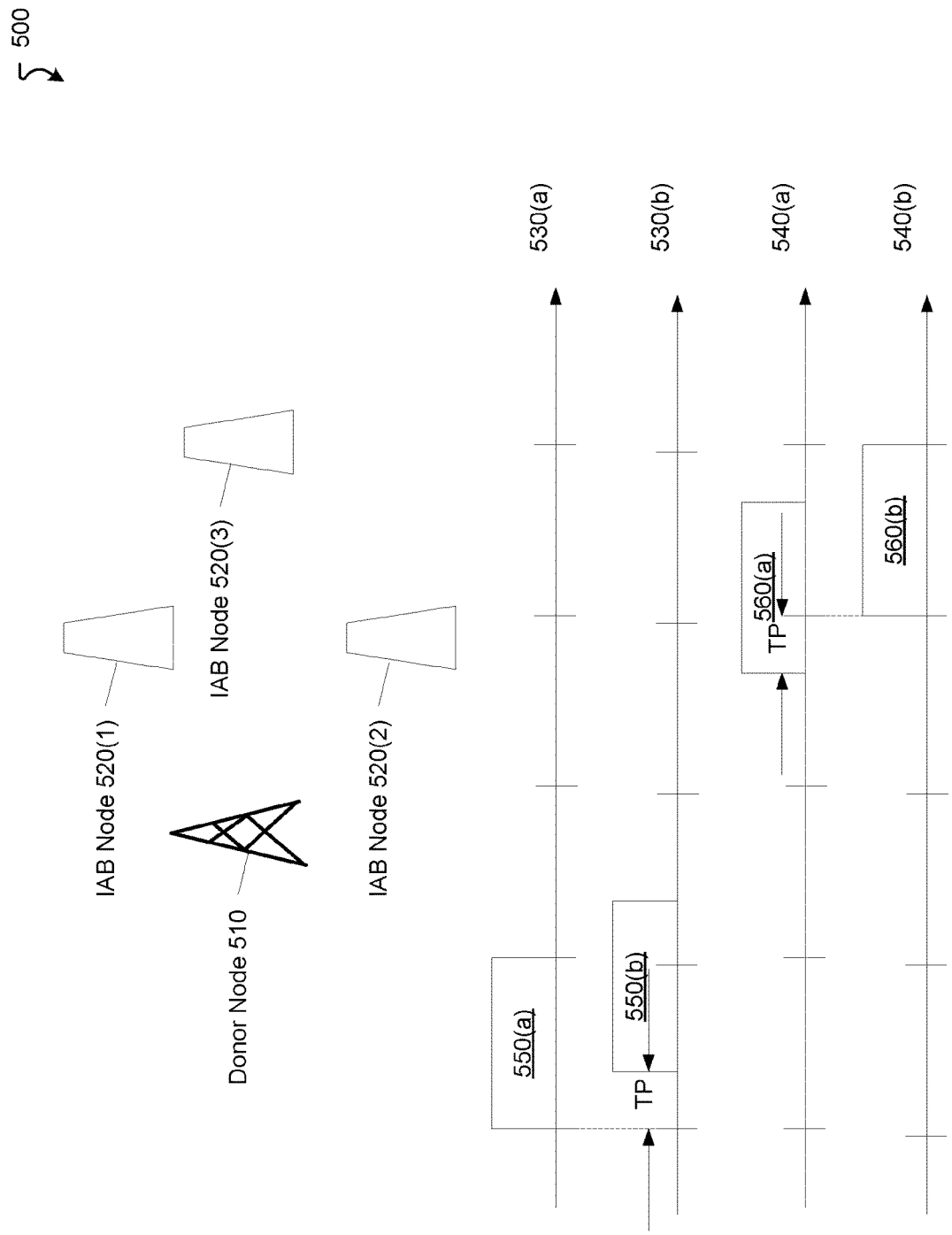
FIG. 5 is a diagram illustrating a derivation and use of a timing advance (TA) in a synchronous IAB network according to an example implementation.
Figure 6:
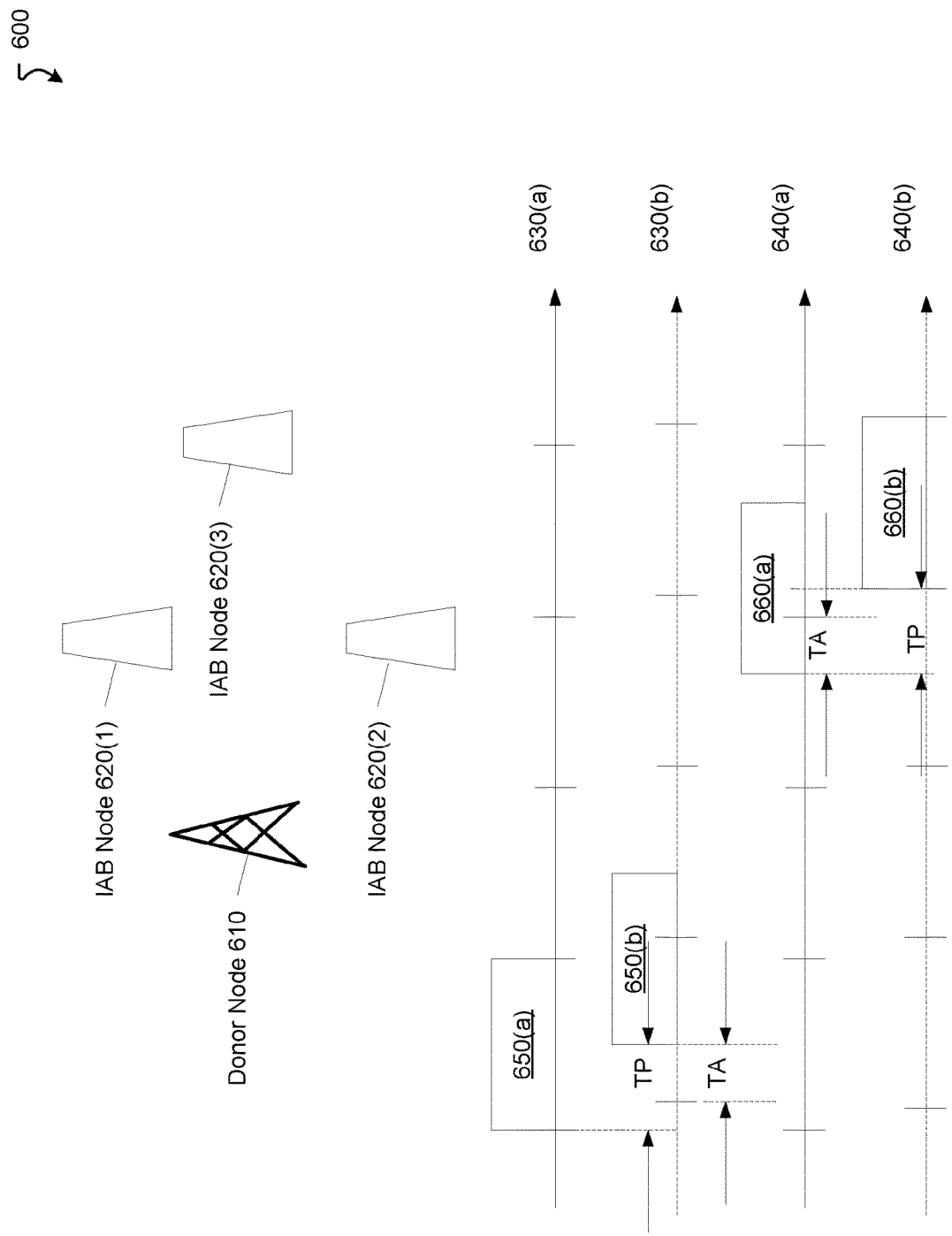
FIG. 6 is a diagram illustrating a derivation and use of a TA in an asynchronous IAB network according to an example implementation.

Details of generating TA values and how the TA values are used during a HO procedure are discussed in further detail with regard to FIGS. 5 and 6.

FIG. 5 is a diagram illustrating a derivation and use of a timing advance (TA) in a synchronous IAB network 500. As shown in FIG. 5, the synchronous IAB network 500 includes an IAB donor node 510 and IAB nodes 520(1,2,3). Each of these nodes of the IAB network 500 is configured to perform two-way measurements of DL TX signals.

Also shown in FIG. 5 are two pairs of timelines 530(a,b) and 540(a,b). The tick marks on the timelines 530(a,b) and 540(a,b) are all aligned with respect to one another because the IAB network 500 is synchronous. The spacing between the tick marks represents a reference DL signal duration.

At the timeline 530(a), a DL reference signal 550(a) is shown. The signal 550(a) is a DL TX signal for IAB node 520(2). At the timeline 530(b), another DL signal 550(b) is shown. The signal 550(b) is the DL RX at IAB node 520(3) of the DL TX signal of IAB node 520(2). The IAB node 520(3) may then measure a propagation delay TP as a difference between the DL TX reference timing and the reception timing of the signal 550(b) at the IAB node 520(3). In the synchronous network 500, the TA value is equal to TP.

At some time later, at the timeline 540(a), the IAB node 520(3) sends an UL TX signal 560(a) to the IAB node 520(2). The signal 560(a) is sent at a time TP earlier than the UL RX reference timing of the IAB node 520(3) assuming that the RX reference timings of the IAB nodes are the same. If there is some known offset between the RX reference times of different IAB nodes, that offset has to be taken into account. In this way, the DL RX signal 560(b) is received at IAB node 520(2) aligned with the RX reference signal timing of the IAB node 520(2).

FIG. 6 is a diagram illustrating a derivation and use of a timing advance (TA) in an asynchronous IAB network 600. As shown in FIG. 6, the synchronous IAB network 600 includes an IAB donor node 610 and IAB nodes 620(1,2,3). Each of these nodes of the IAB network 600 is configured to perform two-way measurements of DL TX signals.

Also shown in FIG. 6 are two pairs of timelines 630(a,b) and 640(a,b). The tick marks on the timelines 630(a,b) and 640(a,b), unlike the timelines 530(a,b) and 540(a,b) of FIG. 5, are not aligned with respect to one another because the IAB network 600 is asynchronous. That is, each IAB node of the IAB network 600 has its own reference signal timing.

At the timeline 630(a), a DL reference signal 650(a) is shown. The signal 650(a) is a DL TX signal for IAB node 620(3). At the timeline 630(b), another DL signal 650(b) is shown. The signal 650(b) is the DL RX at IAB node 620(2) of the DL TX signal of IAB node 620(3). In the asynchronous network 600, the TA value is not necessarily equal to TP. Rather, the TA value is derived relative to the RX reference timing of the receiving node (here, IAB node 620(2)) as shown in FIG. 6.

At some time later, at the timeline 640(a), the IAB node 620(3) sends an UL TX signal 660(a) to the IAB node

620(2). The signal 660(*a*) is sent at a time TA earlier than the DL TX reference timing of the IAB node 620(3). In this way, the UL RX signal 660(*b*) is received at IAB node 620(2) aligned with the RX reference signal timing of the IAB node 620(2).

FIG. 5 is drawn for the special case that the wanted RX timing of migrating node's UL is aligned to TX timing of targets DL. More generally, there could be an offset between these timings. A reason to have such an offset is to allow RX-TX turning time in a TDD system by advancing UL RX timing relative to the DL TX timing.

Special to IAB nodes, there may be other reasons, e.g., aligning in a given IAB node the RX timing of UL signal (coming from child) with RX timing of DL signal (coming from parent). If the timing offset in this case is not known by the different IAB nodes, then FIG. 6 applies.

Figure 7:
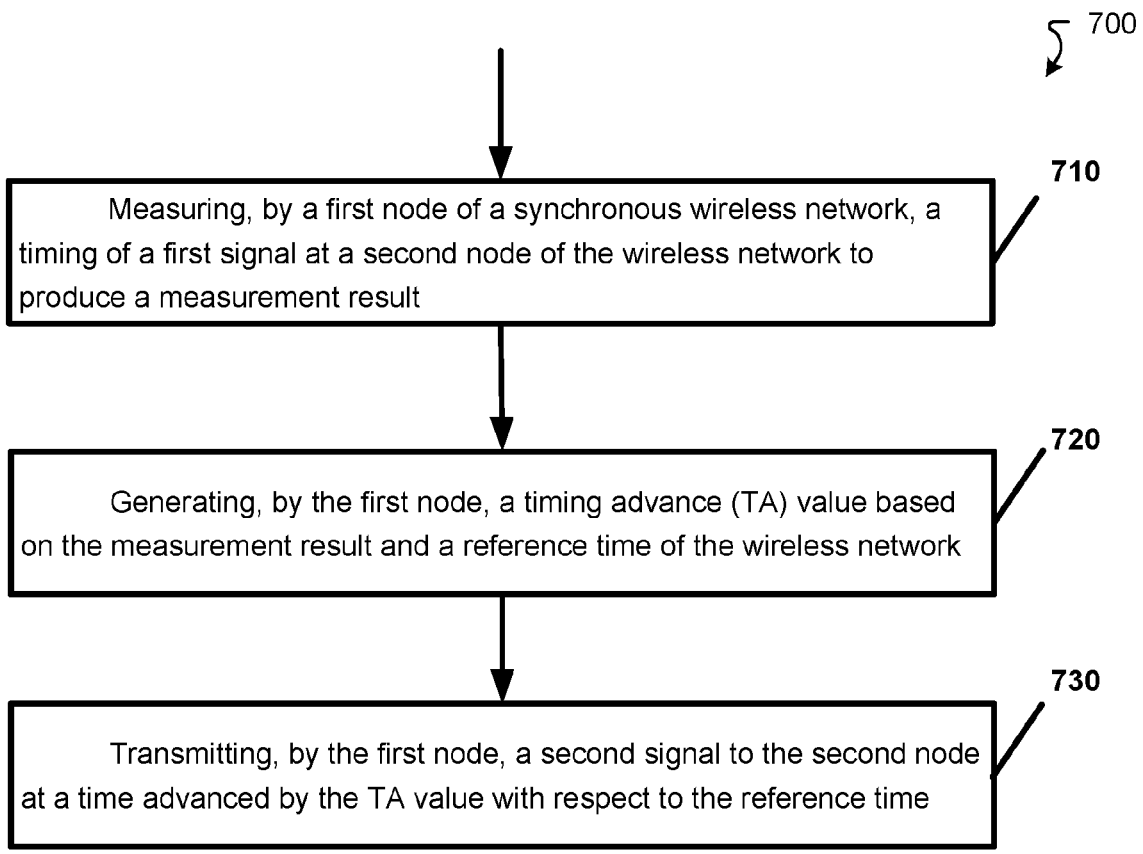
FIG. 7 is a flow chart illustrating a method of deriving a TA in a synchronous IAB network according to an example implementation.

Example 1: FIG. 7 is a flow chart illustrating an example method 700 of performing the improved techniques. Operation 710 includes measuring, by a first node of a wireless network, a timing of a first signal transmitted by a second node of the wireless network to produce a measurement result. Operation 720 includes generating, by the first node, a timing advance (TA) value based on the measurement result and a downlink (DL) transmission (TX) reference time of the wireless network. Operation 730 includes transmitting, by the first node, a second signal to the second node at a time advanced by the TA value with respect to a reception (RX) reference time of the second node.

Example 2: According to an example implementation of example 1, wherein the first signal includes a downlink (DL) broadcast signal.

Example 3: According to an example implementation of example 2, wherein the DL broadcast signal includes a synchronization signal block (SSB).

Example 4: According to an example implementation of example 1, wherein the wireless network includes an integrated access and backhaul (IAB) network.

Example 5: According to an example implementation of example 5, wherein the first node includes a migrating IAB node of the IAB network and the second node includes a target IAB node of the IAB network.

Example 6: According to example implementations of any of examples 1-5, wherein the measuring is performed by a mobile termination (MT) part of the first node.

Example 7: According to example implementations of any of examples 1-6, wherein the first signal is transmitted by a distributed unit (DU) part of the second node.

Example 8: According to an example implementation of example 1, wherein the method further comprises receiving a handover (HO) command message from a third node, the HO command message indicating a HO to the second node, and wherein the transmitting the second signal is performed in response to receiving the HO command message.

Example 9: According to an example implementation of example 8, wherein the indication is received in response to a signal strength of at least one signal sent between the third node and the first node being less than a threshold signal strength.

Example 10: According to an example implementation of example 1, wherein the method further comprises storing the TA value in a table of TA values.

Example 11: According to an example implementation of example 1, wherein the first node includes a distributed unit (DU) and the second node is a donor node including a centralized unit (CU).

Example 12: According to an example implementation of example 11, wherein the CU of the second node is configured to perform radio resource control (RRC) and radio resource management (RRM) functions for the wireless network.

Example 13: According to an example implementation of example 1, wherein the first signal and the second signal include mmWave signals.

Example 14: According to an example implementation of example 1, wherein the first signal and the second signal include channel state indication reference signals (CSI-RS).

Figure 8:
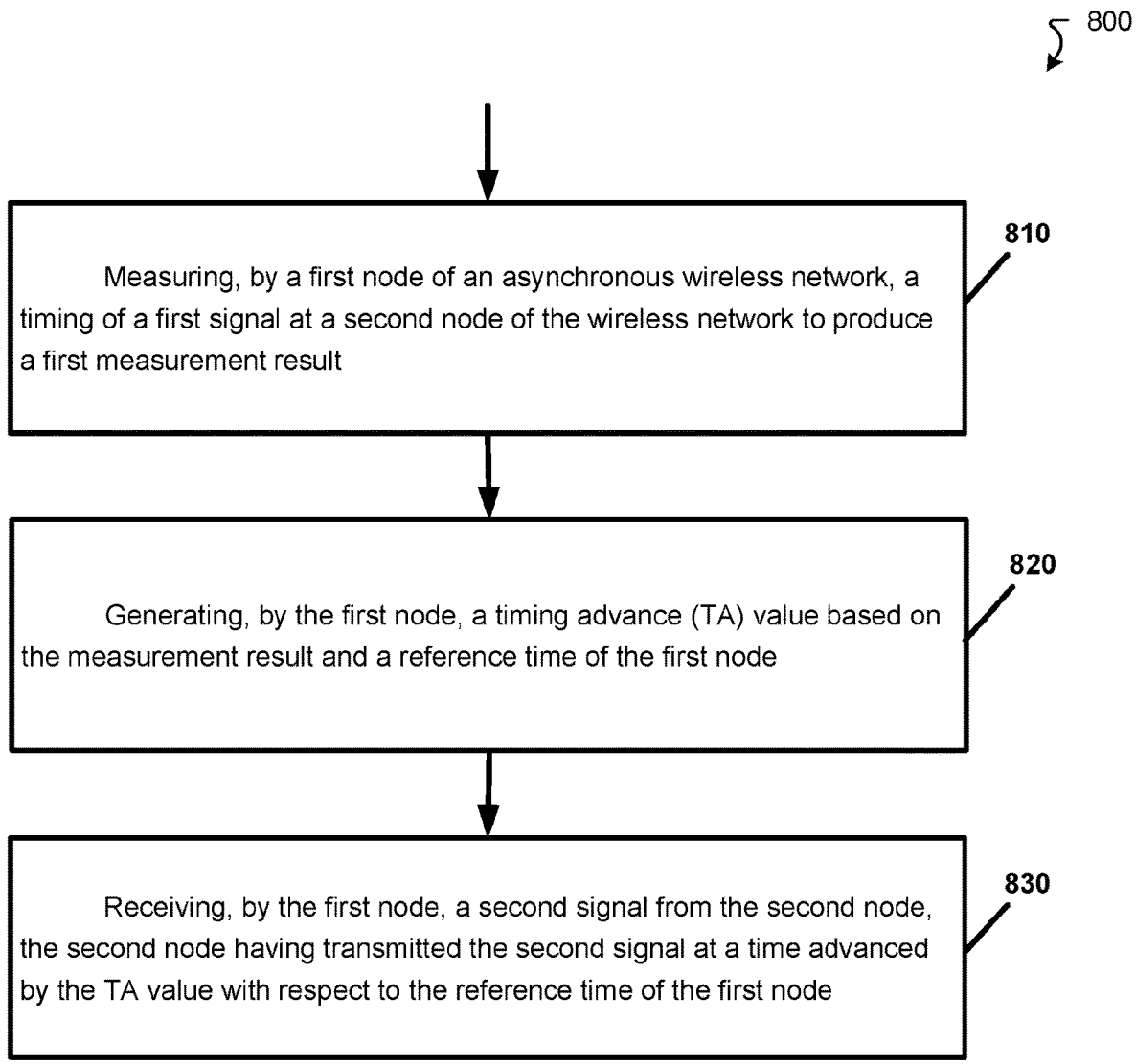
FIG. 8 is a flow chart illustrating a method of deriving a TA in an IAB network according to an example implementation.

Example 15: FIG. 8 is a flow chart illustrating an example method 700 of performing the improved techniques. Operation 810 includes measuring, by a first node of an asynchronous wireless network, a timing of a first signal transmitted by a second node of the wireless network to produce a first measurement result. Operation 820 includes generating, by the first node, a timing advance (TA) value based on the measurement result and an uplink (UL) reception (RX) reference time of the first node, and sending the TA value to the second node via a third node. Operation 830 includes receiving, by the first node, a second signal from the second node, wherein the second signal is transmitted by the second node at a time advanced by the TA value with respect to a downlink (DL) transmission (TX) reference time of the second node.

Example 16: According to an example implementation of example 15, wherein the first signal includes a downlink (DL) broadcast signal.

Example 17: According to an example implementation of example 16, wherein the DL broadcast signal includes a synchronization signal block (SSB).

Example 18: According to an example implementation of example 15, wherein the wireless network includes an integrated access and backhaul (IAB) network.

Example 19: According to an example implementation of example 18, wherein the first node includes a target IAB node of the IAB network and the second node includes a migrating IAB node of the IAB network.

Example 20: According to an example implementation of examples 16-19, wherein the first signal is transmitted by a distributed unit (DU) part of the second node.

Example 21: According to an example implementation of example 15, wherein the receiving the second signal from the second node at the time advanced by the TA value with respect to the reference time of the first node is performed after a HO command message is sent.

Example 22: According to an example implementation of example 21, wherein the first node and the second node include a distributed unit (DU) and the third node includes a donor node including a centralized unit (CU).

Example 23: According to an example implementation of example 22, wherein the CU is configured to perform radio resource control (RRC) and radio resource management (RRM) functions for the wireless network.

Example 24: According to an example implementation of example 15, wherein the first signal includes a downlink (DL) transmission (TX) signal and the TA value for the first node is a DL TA value for the first node.

Example 25: According to an example implementation of example 15, wherein the method further comprises storing the TA value in a table of TA values.

Example 26: According to an example implementation of example 15, wherein the first signal and the second signal include mmWave signals.

Example 27: According to an example implementation of example 15, wherein the first signal and the second signal include channel state indication reference signals (CSI-RS).

Example 28: An apparatus comprising means for performing a method of any of examples 1-14.

Example 29: An apparatus comprising means for performing a method of any of examples 15-27.

Example 30: A computer program product including a non-transitory computer-readable storage medium and storing executable code that, when executed by at least one data processing apparatus, is configured to cause the at least one data processing apparatus to perform a method of any of examples 1-27.

Further example implementations and/or example details will now be provided.

LIST OF EXAMPLE ABBREVIATIONS

Figure 9:
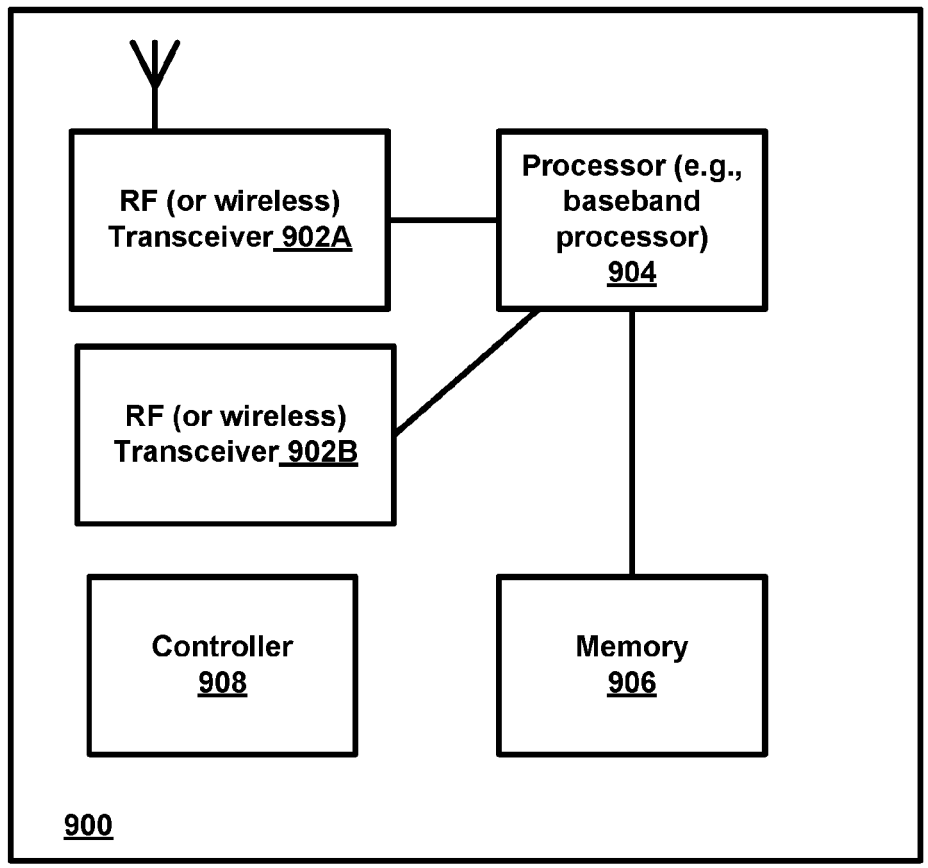
FIG. 9 is a block diagram of a node or wireless station (e.g., base station/access point, relay node, or mobile station/user device) according to an example implementation.

3GPP: third generation partnership project
4G: fourth generation of mobile telecommunication technology
5G: fifth generation of mobile telecommunication technology
5GMM: 5GS mobility management
5GS: 5G system
5GSM: 5GS session management
ACB: access class barring
AMF: access and mobility management function
CSFB: circuit switched fallback
DM: device management
DN: data network
DNN: data network name
EHPLMN: equivalent HPLMN
eMBB: enhanced mobile broadband
eNB: evolved Node B
EPS: evolved packet system
gNB: next generation Node B (uncertain)
HPLMN home PLMN
IMS: IP multimedia subsystem
IoT: internet of things
IP: internet protocol
MME: mobility management entity
MMTel: IMS multimedia telephony service
NAS: non-access stratum
NGAP: next generation application protocol
NSSAI: network slice selection assistance information
OAM: operations, administration, and management
OMA: open mobile alliance
OS: operating system
PCF: policy control function
PDU: protocol data unit
PLMN public land mobile network
RAN: radio access network
RRC: radio resource control
S-NSSAI: single NSSAI
SD: slice differentiator
SMS: short message service
SMSoNAS: SMS over NAS
SMSoIP: SMS over IP
SSAC: service specific access control
SST: slice/service type
UDM: user data management
UE: user equipment
UPF: user plane function
URLLC: ultra-reliable and low latency communication
VPLMN: visited PLMN FIG. 9 is a block diagram of a wireless station (e.g., AP, BS, eNB, UE or user device) 900 according to an example implementation. The wireless station 900 may include, for example, one or two RF (radio frequency) or wireless transceivers 902A, 902B, where each wireless transceiver includes a transmitter to transmit signals and a receiver to receive signals. The wireless station also includes a processor or control unit/entity (controller) 904 to execute instructions or software and control transmission and receptions of signals, and a memory 906 to store data and/or instructions.

Processor 904 may also make decisions or determinations, generate frames, packets or messages for transmission, decode received frames or messages for further processing, and other tasks or functions described herein. Processor 904, which may be a baseband processor, for example, may generate messages, packets, frames or other signals for transmission via wireless transceiver 902 (902A or 902B). Processor 904 may control transmission of signals or messages over a wireless network, and may control the reception of signals or messages, etc., via a wireless network (e.g., after being down-converted by wireless transceiver 902, for example). Processor 904 may be programmable and capable of executing software or other instructions stored in memory or on other computer media to perform the various tasks and functions described above, such as one or more of the tasks or methods described above. Processor 904 may be (or may include), for example, hardware, programmable logic, a programmable processor that executes software or firmware, and/or any combination of these. Using other terminology, processor 904 and transceiver 902 together may be considered as a wireless transmitter/receiver system, for example.

In addition, referring to FIG. 9, a controller (or processor) 908 may execute software and instructions, and may provide overall control for the station 900, and may provide control for other systems not shown in FIG. 9, such as controlling input/output devices (e.g., display, keypad), and/or may execute software for one or more applications that may be provided on wireless station 900, such as, for example, an email program, audio/video applications, a word processor, a Voice over IP application, or other application or software.

In addition, a storage medium may be provided that includes stored instructions, which when executed by a controller or processor may result in the processor 904, or other controller or processor, performing one or more of the functions or tasks described above.

According to another example implementation, RF or wireless transceiver(s) 902A/902B may receive signals or data and/or transmit or send signals or data. Processor 904 (and possibly transceivers 902A/902B) may control the RF or wireless transceiver 902A or 902B to receive, send, broadcast or transmit signals or data.

The embodiments are not, however, restricted to the system that is given as an example, but a person skilled in the art may apply the solution to other communication systems. Another example of a suitable communications system is the 5G concept. It is assumed that network architecture in 5G will be quite similar to that of the LTE-advanced. 5G is likely to use multiple input—multiple output (MIMO) antennas, many more base stations or nodes than the LTE (a so-called small cell concept), including macro sites operating in co-operation with smaller stations and perhaps also employing a variety of radio technologies for better coverage and enhanced data rates.

It should be appreciated that future networks will most probably utilise network functions virtualization (NFV) which is a network architecture concept that proposes virtualizing network node functions into "building blocks" or entities that may be operationally connected or linked together to provide services. A virtualized network function (VNF) may comprise one or more virtual machines running computer program codes using standard or general type servers instead of customized hardware. Cloud computing or data storage may also be utilized. In radio communications this may mean node operations may be carried out, at least partly, in a server, host or node operationally coupled to a remote radio head. It is also possible that node operations will be distributed among a plurality of servers, nodes or hosts. It should also be understood that the distribution of labour between core network operations and base station operations may differ from that of the LTE or even be non-existent.

Implementations of the various techniques described herein may be implemented in digital electronic circuitry, or in computer hardware, firmware, software, or in combinations of them Implementations may be implemented as a computer program product, i.e., a computer program tangibly embodied in an information carrier, e.g., in a machine-readable storage device or in a propagated signal, for execution by, or to control the operation of, a data processing apparatus, e.g., a programmable processor, a computer, or multiple computers Implementations may also be provided on a computer readable medium or computer readable storage medium, which may be a non-transitory medium Implementations of the various techniques may also include implementations provided via transitory signals or media, and/or programs and/or software implementations that are downloadable via the Internet or other network(s), either wired networks and/or wireless networks. In addition, implementations may be provided via machine type communications (MTC), and also via an Internet of Things (IoT).

The computer program may be in source code form, object code form, or in some intermediate form, and it may be stored in some sort of carrier, distribution medium, or computer readable medium, which may be any entity or device capable of carrying the program. Such carriers include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers.

Furthermore, implementations of the various techniques described herein may use a cyber-physical system (CPS) (a system of collaborating computational elements controlling physical entities). CPS may enable the implementation and exploitation of massive amounts of interconnected ICT devices (sensors, actuators, processors microcontrollers, . . . ) embedded in physical objects at different locations. Mobile cyber physical systems, in which the physical system in question has inherent mobility, are a subcategory of cyber-physical systems. Examples of mobile physical systems include mobile robotics and electronics transported by humans or animals. The rise in popularity of smartphones has increased interest in the area of mobile cyber-physical systems. Therefore, various implementations of techniques described herein may be provided via one or more of these technologies.

A computer program, such as the computer program(s) described above, can be written in any form of programming language, including compiled or interpreted languages, and can be deployed in any form, including as a stand-alone program or as a module, component, subroutine, or other unit or part of it suitable for use in a computing environment. A computer program can be deployed to be executed on one computer or on multiple computers at one site or distributed across multiple sites and interconnected by a communication network.

Method steps may be performed by one or more programmable processors executing a computer program or computer program portions to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer, chip or chipset. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in, special purpose logic circuitry.

To provide for interaction with a user, implementations may be implemented on a computer having a display device, e.g., a cathode ray tube (CRT) or liquid crystal display (LCD) monitor, for displaying information to the user and a user interface, such as a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the various embodiments.

What is claimed is:

1. An apparatus comprising:
at least one processor; and
at least one memory including computer program code;
the at least one memory and the computer program code configured to, with the at least one processor, cause the apparatus at least to:
measure a timing of a first signal received from a second node of a wireless network to produce a measurement result;
generate a timing advance value based on the measurement result and an uplink reception reference time of the apparatus;
send the timing advance value to the second node; and
receive a second signal from the second node, wherein transmission of the second signal is at a time advanced by the timing advance value with respect to a downlink transmission reference time of the second node,
wherein the receiving the second signal from the second node is performed after a handover command message is received at the second node.

2. The apparatus as in claim 1, wherein the first signal includes a downlink broadcast signal.

3. The apparatus as in claim 2, wherein the downlink broadcast signal includes a synchronization signal block.

4. The apparatus as in claim 1, wherein the wireless network includes an integrated access and backhaul network.

5. The apparatus as in claim 4, wherein the apparatus includes a target integrated access and backhaul node of the integrated access and backhaul network, and the second node includes a migrating integrated access and backhaul node of the integrated access and backhaul network.

6. The apparatus as in claim 1, wherein the first signal includes a downlink transmission signal and the timing advance value for the apparatus comprises an uplink timing advance value for the apparatus.

7. The apparatus as in claim 1, wherein the at least one memory and the computer program code is further configured to, with the at least one processor, cause the apparatus at least to:
store the timing advance value in a table of timing advance values.

8. The apparatus as in claim 1, wherein the first signal and the second signal include channel state indication reference signals.

9. An apparatus comprising:
at least one processor; and
at least one memory including computer program code;
the at least one memory and the computer program code configured to, with the at least one processor, cause the apparatus at least to:
measure a timing of a first signal received from a second node of a wireless network to produce a measurement result;
generate a timing advance value based on the measurement result and a downlink transmission reference time of the wireless network;
receive a handover command message from a third node, the handover command message indicating a handover to the second node; and
in response to receiving the handover command message, transmit a second signal to the second node at a time advanced by the timing advance value with respect to a reception reference time of the second node,
wherein the receiving the second signal from the second node is performed after a handover command message is received at the second node.

10. The apparatus as in claim 9, wherein the first signal includes a downlink broadcast signal.

11. The apparatus as in claim 10, wherein the downlink broadcast signal includes a synchronization signal block.

12. The apparatus as in claim 9, wherein the wireless network includes an integrated access and backhaul network.

13. The apparatus as in claim 12, wherein the apparatus includes a migrating integrated access and backhaul node of the integrated access and backhaul network, and the second node includes a target integrated access and backhaul node of the integrated access and backhaul network.

14. The apparatus as in claim 9, wherein the measuring is performed at a mobile termination part of the apparatus.

15. The apparatus as in claim 9, wherein the handover command message is received in response to a signal strength of signals sent between the third node and the apparatus being less than a threshold signal strength.

16. The apparatus as in claim 9, wherein the at least one memory and the computer program code is further configured to, with the at least one processor, cause the apparatus at least to:
store the timing advance value in a table of timing advance values.

17. The apparatus as in claim 9, wherein the first signal and the second signal include channel state indication reference signals.

18. A method, comprising:
measuring, by a first node of a wireless network, a timing of a first signal received from a second node of the wireless network to produce a measurement result;
generating, by the first node, a timing advance value based on the measurement result and an uplink reception reference time of the first node;
sending the timing advance value to the second node; and
receiving, by the first node, a second signal from the second node, wherein transmission of the second signal is at a time advanced by the timing advance value with respect to a downlink transmission reference time of the second node,
wherein the receiving the second signal from the second node is performed after a handover command message is received at the second node.

* * * * *